US012643602B2

(12) United States Patent (10) Patent No.: US 12,643,602 B2
Sonoda et al. (45) Date of Patent: Jun. 2, 2026

(54) STEERING DEVICE AND METHOD FOR CONTROLLING STEERING DEVICE

(71) Applicants:HITACHI ASTEMO, LTD., Hitachinaka (JP); National University Corporation Tokyo University of Agriculture and Technology, Fuchu (JP)

(72) Inventors: Hiroki Sonoda, Hitachinaka (JP); Yoshiji Hasegawa, Hitachinaka (JP); Tomoaki Fujibayashi, Hitachinaka (JP); Hiroshi Mouri, Fuchu (JP)

(73) Assignees: HITACHI ASTEMO, LTD., Hitachinaka (JP); National University Corporation Tokyo University of Agriculture and Technology, Fuchu (JP)

( * ) Notice: Subject to any disclaimer, the term of this patent is extended or adjusted under 35 U.S.C. 154(b) by 512 days.

(21) Appl. No.: 18/261,061

(22) PCT Filed: Dec. 28, 2021

(86) PCT No.: PCT/JP2021/048988
§ 371 (c)(1),
(2) Date: Jul. 11, 2023

(87) PCT Pub. No.: WO2022/153880
PCT Pub. Date: Jul. 21, 2022

(65) Prior Publication Data
US 2024/0092421 A1 Mar. 21, 2024

(30) Foreign Application Priority Data
Jan. 13, 2021 (JP) ................................. 2021-003286

(51) Int. Cl.
B62D 6/02 (2006.01)
B62D 5/00 (2006.01)
B62D 5/04 (2006.01)

(52) U.S. Cl.
CPC ............... B62D 6/02 (2013.01); B62D 5/001 (2013.01); B62D 5/0406 (2013.01)

(58) Field of Classification Search
CPC ........ B62D 6/02; B62D 5/001; B62D 5/0406; B62D 6/003; B62D 6/002
(Continued)

(56) References Cited

U.S. PATENT DOCUMENTS

| | | | | |
|---|---|---|---|---|
| 2014/0229068 A1* | 8/2014 | Ueyama | ................ | B60W 10/20 701/41 |
| 2018/0319422 A1* | 11/2018 | Polmans | ................ | B62D 6/008 |
| 2024/0359697 A1* | 10/2024 | Kim | ........................ | B62D 7/159 |

FOREIGN PATENT DOCUMENTS

| | | |
|---|---|---|
| JP | 2013-023145 A | 2/2013 |

OTHER PUBLICATIONS

International Preliminary Report on Patentability dated Jul. 27, 2023 issued in International Patent Application No. PCT/JP2021/048988, with English translation, 10 pages.
(Continued)

*Primary Examiner* — Yi-Kai Wang
(74) *Attorney, Agent, or Firm* — FOLEY & LARDNER LLP

(57) ABSTRACT

A steering device and a method for controlling the steering device according to the present invention are capable of suppressing, in a steer-by-wire steering device including a steering operation input member and a turning actuator that applies a turning force to a road wheel based on a driving signal, a change in which a yaw rate gain of a vehicle rises with respect to the operation speed of the steering operation
(Continued)

input member by changing a turning angle command value to an angle less than the angle before the change when a turning frequency of the road wheel is a predetermined frequency. As a result, it becomes possible to suppress a case in which the yaw rate gain of the vehicle becomes too sensitive with respect to a steering operation by a driver.

10 Claims, 7 Drawing Sheets

(58) Field of Classification Search
USPC ........................................................... 701/41
See application file for complete search history.

(56) References Cited

OTHER PUBLICATIONS

International Search Report dated Feb. 1, 2022 issued in International Patent Application No. PCT/JP2021/048988, with English translation, 5 pages.

* cited by examiner

FIG.2

OPERATION ANGLE θ
[deg]

TIME

σtg AFTER CHANGE
[deg]

TIME

WITHOUT BAND-STOP FILTER

WITH BAND-STOP FILTER

WITH BAND-STOP FILTER

WITHOUT BAND-STOP FILTER

YAW RATE GAIN

1

0

PHASE [deg]

0

−180

$10^{-1}$          $10^{0}$

FREQUENCY f [Hz]

GAIN Kf
(ATTENUATION RANGE)

1.0

0

OPERATION ANGLE θ [deg]

1.0

GAIN Ka
(ATTENUATION RATE)

0

OPERATION ANGLE θ [deg]

STEERING DEVICE AND METHOD FOR CONTROLLING STEERING DEVICE

TECHNICAL FIELD

The present invention relates to a steer-by-wire steering device and to a method for controlling the steer-by-wire steering device.

BACKGROUND ART

A vehicle steering device in Patent Document 1 is a steer-by-wire vehicle steering device in which steering operation means and a turning mechanism are mechanically separated from each other, and includes: steering gear ratio variable means capable of freely changing a steering gear ratio that is a ratio of a steering angle applied to the steering operation means to a turning angle of road wheels; vehicle speed detection means for detecting a vehicle speed; steering angle detection means for detecting the steering angle of the steering operation means; and steering gear ratio control means of controlling the steering gear ratio variable means such that the steering gear ratio increases as the vehicle speed increases based on of the detected vehicle speed and steering angle.

REFERENCE DOCUMENT LIST

Patent Document

Patent Document 1: JP 2013-023145 A

SUMMARY OF THE INVENTION

Problem to be Solved by the Invention

In a steer-by-wire steering device, when the steering gear ratio is set to be lower as the vehicle speed decreases, the operation amount of a steering wheel (steering operation input member) when the vehicle speed is low can be reduced, in other words, the movement of changing the grip on the steering wheel can be reduced.

However, when the steering gear ratio is caused to be lower, there have been cases in which the yaw rate gain of the vehicle with respect to the steering operation by a driver becomes too sensitive and a vehicle behavior different from that intended by the driver occurs, thereby reducing the steering performance of the vehicle.

The present invention has been made in view of the actual situation hitherto, and an object thereof is to provide a steering device and a method for controlling the steering device capable of suppressing a case in which the yaw rate gain of a vehicle becomes too sensitive with respect to the steering operation by a driver.

Means for Solving the Problem

According to the present invention, in one aspect thereof, the turning speed of road wheels with respect to an operation speed of a steering operation input member is caused to be slower when the yaw rate gain shows a change of rising with respect to the operation speed.

Effects of the Invention

According to the present invention, it becomes possible to suppress a case in which the yaw rate gain of the vehicle becomes too sensitive with respect to the steering operation by the driver and to improve the steering performance of the vehicle.

BRIEF DESCRIPTION OF THE DRAWINGS

FIG. 2 is a block diagram showing a function of controlling a turning angle included in a control device.

MODE FOR CARRYING OUT THE INVENTION

An embodiment of a steering device and a method for controlling the steering device according to the present invention is described below with reference to the drawings.

Figure 1:
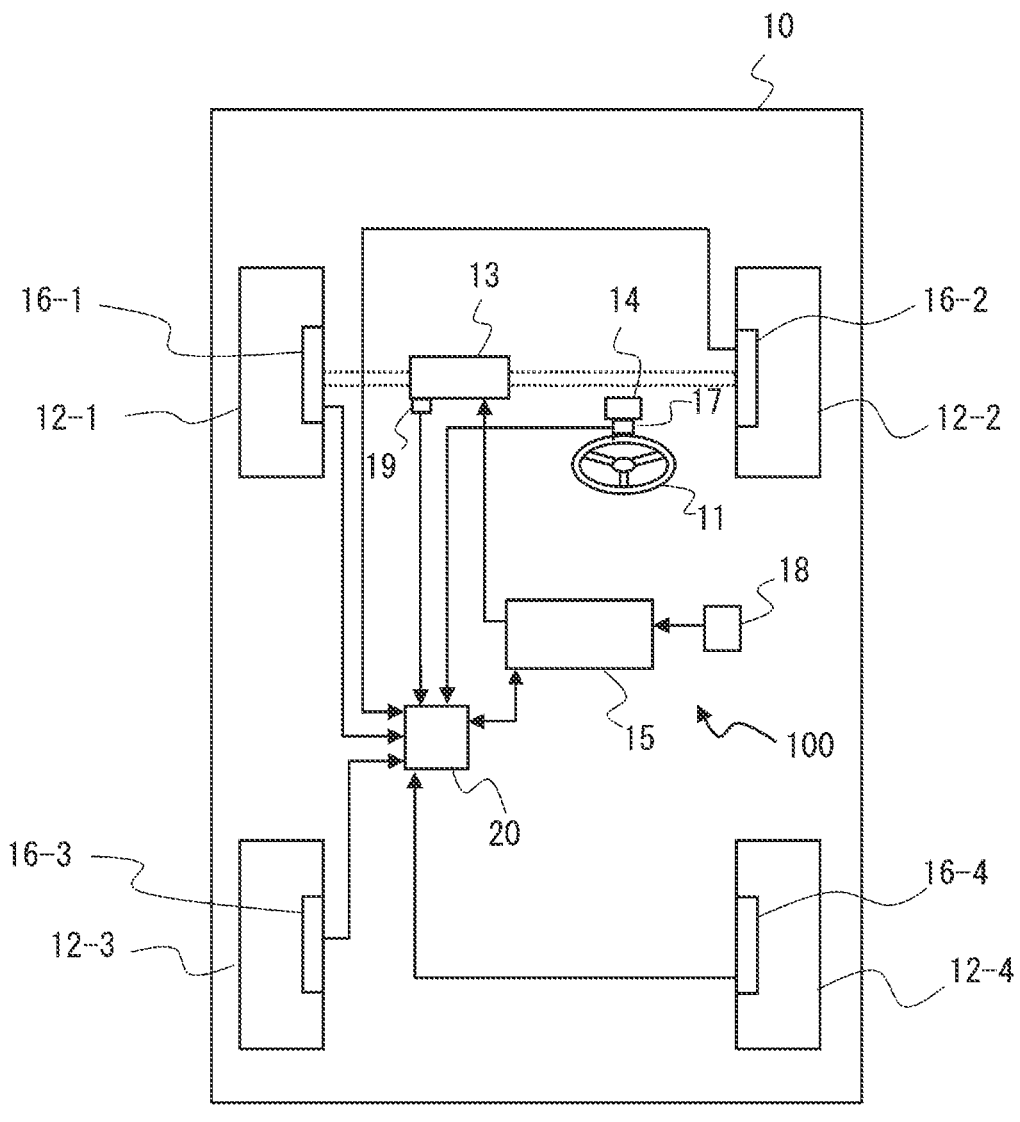
FIG. 1 is a system configuration diagram of a steering device.

FIG. 1 is a system configuration diagram showing one aspect of a steering device 100.

Steering device 100 is a steer-by-wire steering device to be mounted on a vehicle 10.

Steering device 100 includes a steering wheel 11 serving as a steering operation input member, a turning actuator 13 that applies a turning force to a pair of front wheels 12-1, 12-2 (turning road wheels), a reaction force actuator 14 that applies operation reaction force to steering wheel 11, and a control device 15 that outputs driving signals to turning actuator 13 and reaction force actuator 14.

Here, steering wheel 11 (reaction force actuator 14) and front wheels 12-1, 12-2 (turning actuator 13) are not mechanically joined to each other and are separated from each other.

Turning actuator 13 includes a turning motor, a turning mechanism, a decelerator, and the like, and reaction force actuator 14 includes a reaction force motor, a decelerator, and the like.

Vehicle 10 is a four-wheeled automobile including a pair of rear wheels 12-3, 12-4 in addition to pair of front wheels 12-1, 12-2.

Road wheels 12-1, 12-2, 12-3, 12-4 include wheel speed sensors 16-1, 16-2, 16-3, 16-4 that each detect a wheel speed.

Vehicle 10 includes an operation angle sensor 17 that detects operation angle $\theta$ of steering wheel 11, an acceleration speed sensor 18 that detects the front-rear acceleration speed and the lateral acceleration speed of vehicle 10, and a turning angle sensor 19 that detects a turning angle $\sigma$ (in other words, the wheel angle) of front wheels 12-1, 12-2.

Control device 15 is an electronic control device of which a main constituent is a microcomputer including a calculation unit such as a central processing unit (CPU), a main storage device, an auxiliary storage device, an input and output device, a timer, and the like.

Control device 15 is connected to road wheel speed sensors 16-1, 16-2, 16-3, 16-4, operation angle sensor 17, acceleration speed sensor 18, turning angle sensor 19, and the like via a communication bus line 20 and acquires each detection information on the wheel speed, operation angle θ, acceleration speed, and turning angle σ from each sensor.

Control device 15 outputs driving signals to turning actuator 13 and reaction force actuator 14 by calculation processing based on various acquired information.

Here, the functions of controlling the turning angle (turning actuator 13) and the operation reaction force (reaction force actuator 14) by control device 15 are realized by periodically executing a program loaded on the main storage device by a calculation device while referring to a database stored in the auxiliary storage device.

Figure 2:
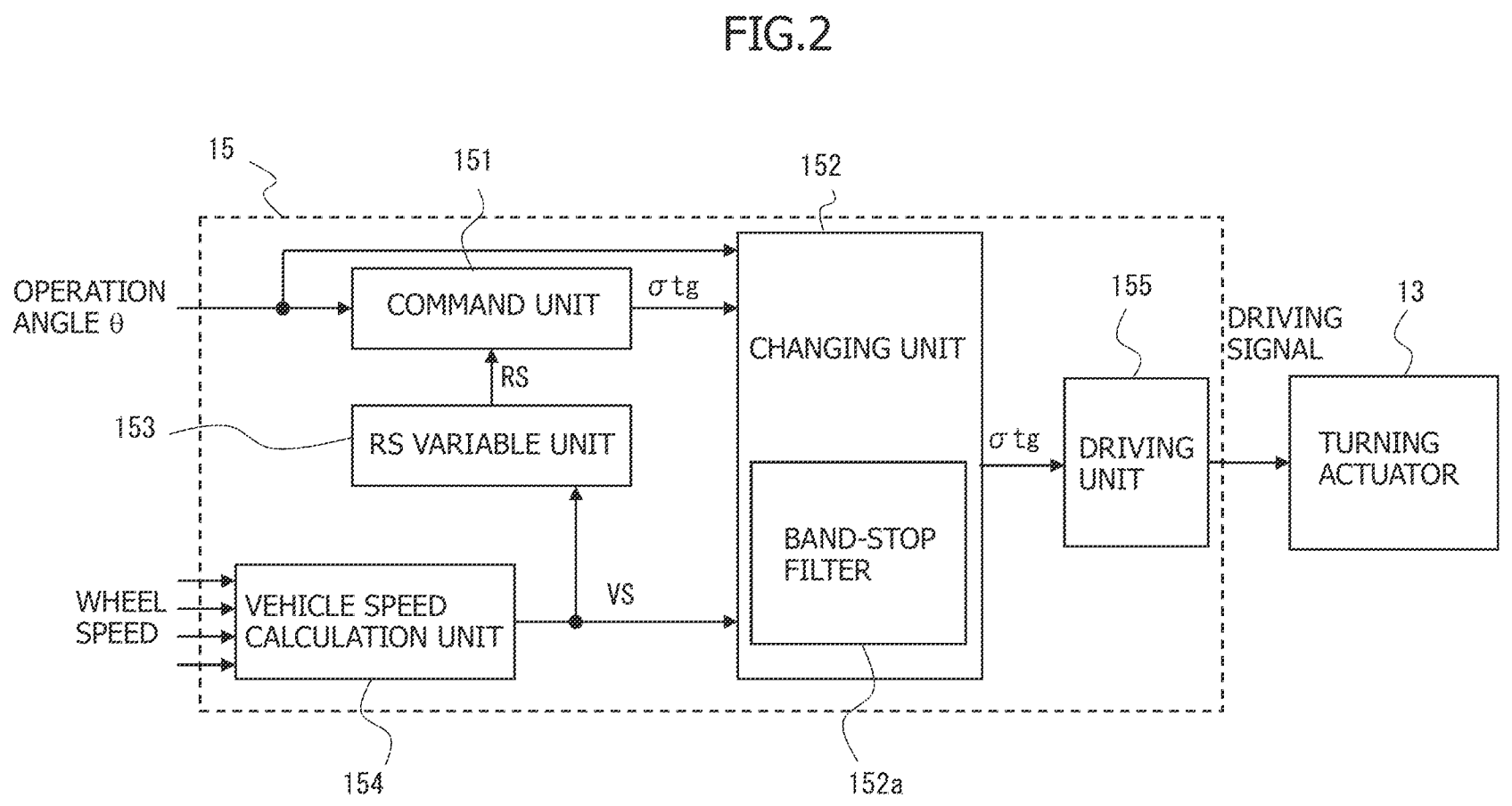

FIG. 2 is a block diagram showing the function of controlling the turning angle (turning actuator 13) in control device 15.

Control device 15 includes a turning angle command unit 151, a turning angle changing unit 152, a steering gear ratio variable unit 153, a vehicle speed calculation unit 154, and a driving unit 155.

Turning angle command unit 151 acquires information on operation angle θ of steering wheel 11 detected by operation angle sensor 17, and calculates turning angle command value σtg based on operation angle θ and a steering gear ratio RS.

Here, steering gear ratio RS is defined as steering gear ratio RS=operation angle θ/turning angle σ.

Therefore, as steering gear ratio RS decreases, turning angle σ with respect to operation angle θ increases, and steering characteristics in which the road wheel turning angle (turning angle σ) of front wheels 12-1, 12-2 greatly changes by turning steering wheel 11 a little are obtained.

In addition, as steering gear ratio RS increases, turning angle σ with respect to operation angle θ decreases, and steering characteristics in which the road wheel turning angle (turning angle σ) of front wheels 12-1, 12-2 does not change unless steering wheel 11 is turned by a substantial amount are obtained.

In the case of a steering device in which front wheels 12-1, 12-2 and steering wheel 11 are mechanically joined to each other, steering gear ratio RS is a ratio expressing the degree of deceleration in a steering gear box.

However, in the case of steer-by-wire steering device 100 in which front wheels 12-1, 12-2 and steering wheel 11 are mechanically separated from each other, there are no steering gear boxes. Therefore, steering gear ratio RS does not express the deceleration ratio of the steering gear box, but it is a coefficient used in calculation of turning angle command value σtg in the control device 15 and is data that can be freely set.

Turning angle command unit 151 acquires information on steering gear ratio RS from steering gear ratio variable unit 153.

Steering gear ratio variable unit 153 acquires information on vehicle speed VS [km/h] of vehicle 10 from vehicle speed calculation unit 154, variably calculates steering gear ratio RS in accordance with vehicle speed VS, and transmits information on calculated steering gear ratio RS to turning angle command unit 151.

As vehicle speed VS becomes slower, steering gear ratio variable unit 153 sets steering gear ratio RS to be lower and reduces the operation amount of steering wheel 11 by the driver in a low vehicle-speed range (in other words, reduces the movement of changing the grip on steering wheel 11).

Vehicle speed calculation unit 154 acquires a detection signal of each of road wheel speed sensors 16-1, 16-2, 16-3,

16-4, and estimates vehicle speed VS [km/h] of vehicle 10 from information on the wheel speed of each of the four road wheels.

Turning angle changing unit 152 acquires information on turning angle command value σtg calculated by turning angle command unit 151, changes turning angle command value σtg in accordance with conditions such as vehicle speed VS and turning frequency f of front wheels 12-1, 12-2, and outputs turning angle command value σtg to driving unit 115.

Driving unit 155 outputs a driving signal to turning actuator 13 based on acquired turning angle command value σtg.

Here, the condition by which turning angle changing unit 152 changes turning angle command value σtg is when the yaw rate gain of vehicle 10 shows a change of rising with respect to the operation speed of steering wheel 11, as described below.

The rise in the yaw rate gain occurs when vehicle speed VS is within a low vehicle-speed range from 0 km/h to about 20 km/h and turning frequency f is within a frequency range from about 1 Hz to about 3 Hz, for example.

When the yaw rate gain of vehicle 10 shows a change of rising with respect to the operation speed of steering wheel 11, turning angle changing unit 152 changes turning angle command value σtg to an angle that is less than the angle before the change so as to cause the turning speed of front wheels 12-1, 12-2 with respect to the operation speed to be slower, and outputs information on turning angle command value σtg after the change to driving unit 155.

In addition, when the yaw rate gain of vehicle 10 does not show a change of rising with respect to the operation speed of steering wheel 11, turning angle changing unit 152 directly outputs information on turning angle command value σtg calculated by turning angle command unit 151 to driving unit 155 without changing the information.

Steering gear ratio variable unit 153 causes steering gear ratio RS to be lower in the low vehicle-speed range than in the high vehicle-speed range. However, when steering gear ratio RS is caused to be lower, the yaw rate gain of vehicle 10 with respect to the operation of steering wheel 11 by the driver may become too sensitive and a vehicle behavior different from that intended by the driver may occur.

Figure 3:
FIG. 3 is a line map showing the correlation between a turning frequency f and a yaw rate gain.

FIG. 3 is a line map showing the correlation between turning frequency f [Hz] and the yaw rate gain for each condition for vehicle speed VS, and shows characteristics when steering gear ratio RS is variable in accordance with vehicle speed VS and information on turning angle command value σtg calculated by turning angle command unit 151 is directly given to driving unit 155.

When vehicle speed VS of vehicle 10 is 40 km/h or 80 km/h (in other words, in an intermediate or high speed range), the yaw rate gain is substantially constant in a region in which turning frequency f is lower than 1 Hz, and the yaw rate gain decreases as frequency f changes in an increasing manner in a region in which turning frequency f is greater than 1 Hz.

In addition, when vehicle speed VS of vehicle 10 is in a low speed range of 10 km/h or km/h, the yaw rate gain becomes a local maximal value at a place in which turning frequency f is around 2 Hz and is higher than 1 Hz.

In detail, when vehicle speed VS of vehicle 10 is 10 km/h or 20 km/h, the yaw rate gain changes in an increasing manner as turning frequency f increases around a place in which turning frequency f=1 Hz is satisfied, the yaw rate gain becomes a local maximal value around a place in which turning frequency f=2 Hz is satisfied, and the yaw rate gain decreases when turning frequency f becomes higher than a place around 2 Hz.

In other words, when vehicle 10 travels in a low vehicle-speed range in which steering gear ratio RS is caused to be lower, the yaw rate gain shows a change of rising with respect to the operation speed of steering wheel 11 when turning frequency f is within a frequency range of about 1 Hz to 3 Hz.

The generation of the yaw rate caused by turning of front wheels 12-1, 12-2 occurs in the order of turning, generation of a road wheel angle, rolling of the road wheels, generation of a lateral force, and the generation of the yaw rate.

In the low vehicle-speed range, it takes time for the road wheels to roll. Therefore, a delay occurs in the generation of the lateral force and the yaw rate as compared to the intermediate and high speed ranges, and the delay time affects the behavior of vehicle 10. Thus, the change in which the yaw rate gain rises is determined by the relationship between the relaxation length of road wheels and vehicle speed VS.

The relaxation length of the road wheels is a travel distance necessary for the road wheels to output a constant lateral force with respect to a step input of a slip angle and the like.

As above, in the low vehicle-speed range in which steering gear ratio RS is caused to be lower, the yaw rate gain may become too great and operability by the driver may be impaired when turning frequency f is a predetermined frequency.

Thus, when the yaw rate gain of vehicle 10 shows a change of rising with respect to the operation speed of steering wheel 11, turning angle changing unit 152 changes the turning angle command value so as to cause the turning speed of front wheels 12-1, 12-2 with respect to the operation speed to be slower. As a result, the rise in the yaw rate gain is suppressed and the decrease of operability by the driver is suppressed.

In detail, turning angle changing unit 152 applies filtering processing that attenuates predetermined frequency components for turning angle command value σtg when vehicle speed VS is in a predetermined low vehicle-speed range, and outputs turning angle command value σtg after the filtering processing to driving unit 155.

In other words, turning angle changing unit 152 causes the turning speed of front wheels 12-1, 12-2 with respect to the operation speed of steering wheel 11 to be slower by attenuating the signal of turning angle command value σtg (in other words, changing the signal to a value of which absolute value is lower than the value before the change) by a condition with which the yaw rate gain of vehicle 10 shows a change of rising with respect to the operation speed of steering wheel 11.

As a result, it becomes possible to suppress a case in which the yaw rate gain of the vehicle becomes too sensitive with respect to the steering operation by the driver and to improve the steering performance of the vehicle.

Here, turning angle changing unit 152 changes turning angle command value σtg with use of a band-stop filter 152a of which attenuation range is turning frequency fat which the yaw rate gain shows a change of rising.

For example, a transfer function G(s) of band-stop filter 152a is obtained by Expression 1.

$$G(s) = \frac{s^2 + \omega_a^2}{s^2 + \zeta\omega_a s + \omega_a^2} \qquad \text{[Expression 1]}$$

Here, the frequency range in which the yaw rate gain rises (in other words, the frequency at which the yaw rate gain becomes the local maximal value) changes depending on vehicle speed VS. Therefore, turning angle changing unit 152 changes the frequency range (attenuation range) in which band-stop filter 152a attenuates turning angle command value σtg in accordance with vehicle speed VS.

The rise in the yaw rate gain increases as vehicle speed VS decreases. Therefore, turning angle changing unit 152 causes the attenuation rate of band-stop filter 152a to increase as vehicle speed VS decreases so as to greatly reduce the yaw rate gain as vehicle speed VS decreases.

In the intermediate and high vehicle-speed ranges in which the yaw rate gain of vehicle does not show a change of rising with respect to the operation speed of steering wheel 11, turning angle changing unit 152 causes the attenuation rate to be lower and substantially invalidate the filtering processing.

As a result, even when information on turning angle command value σtg is caused to pass through band-stop filter 152a in all vehicle speed ranges, a case in which turning angle command value σtg is uselessly attenuated in the intermediate and high vehicle-speed ranges is suppressed.

Turning angle changing unit 152 can process the signal of turning angle command value σtg by band-stop filter 152a when the range is a low vehicle-speed range and directly output the signal of turning angle command value σtg to driving unit 155 by bypassing band-stop filter 152a when the range is an intermediate or high vehicle-speed range.

In other words, turning angle changing unit 152 can switch between a case of causing the information on turning angle command value σtg to pass through band-stop filter 152a and a case of causing the information to bypass band-stop filter 152a, depending on the condition of vehicle speed VS.

Figure 4:
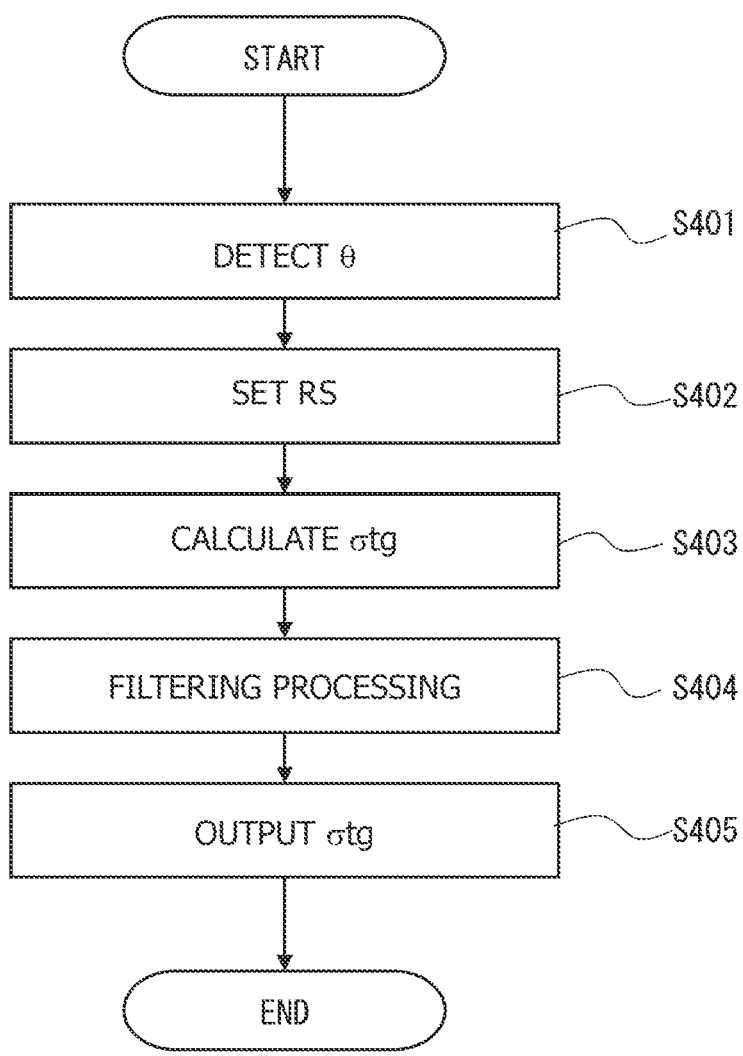
FIG. 4 is a flowchart showing a procedure of controlling the turning angle by the control device.

FIG. 4 is a flowchart showing a procedure for controlling the turning angle of front wheels 12-1, 12-2 by control device 15.

Control device 15 acquires information on operation angle θ of steering wheel 11 in Step S401 and changes steering gear ratio RS in accordance with vehicle speed VS in the following Step S402.

Next, in Step S403, control device 15 calculates turning angle command value σtg based on operation angle θ and steering gear ratio RS.

In Step S404, control device 15 performs filtering processing that changes an absolute value of turning angle command value σtg to be lower when vehicle speed VS is low and turning frequency f is within a predetermined frequency range.

In Step S405, control device 15 outputs turning angle command value σtg to which processing of changing turning angle command value σtg to be lower has been applied in Step S404 to driving unit 155 when vehicle speed VS is low and turning frequency f is within a predetermined frequency range, and directly outputs turning angle command value σtg calculated in Step S403 to driving unit 155 without changing turning angle command value σtg when the condition of vehicle speed VS and/or the condition of turning frequency f do not satisfy the conditions described above.

Figure 5:
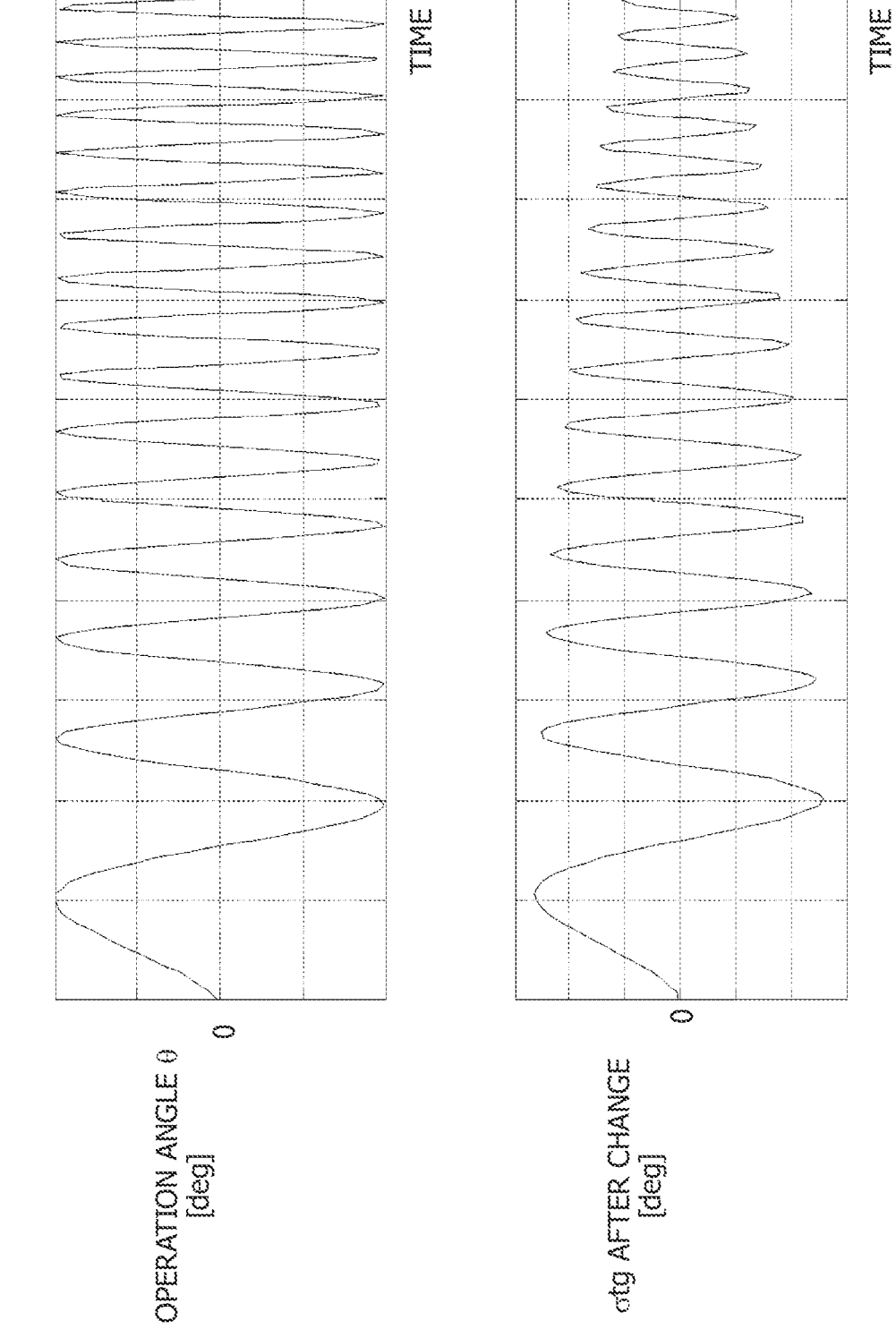
FIG. 5 is a time chart showing the correlation between an operation angle $\theta$ and a turning angle command value $\sigma tg$ after filtering processing.

FIG. 5 is a time chart showing the change in operation angle θ of steering wheel 11 and turning angle command value σtg output by turning angle changing unit 152.

The upper stage in FIG. 5 shows the change in operation angle θ of steering wheel 11. In the example in FIG. 5, the frequency of operation angle θ increases with the elapse of time.

In addition, the lower stage in FIG. 5 shows turning angle command value σtg after predetermined frequency components have been attenuated by band-stop filter 152a, and the absolute value of the signal of turning angle command value σtg is changed to be lower as the frequency of the signal of operation angle θ increases.

In other words, when the yaw rate gain of vehicle 10 shows a change of rising with respect to the operation speed of steering wheel 11, control device 15 outputs a driving signal that causes the turning speed of the road wheels with respect to the operation speed to be slower to turning actuator 13 by attenuating turning angle command value σtg by band-stop filter 152a.

Figure 6:
FIG. 6 is a line map showing a difference in the yaw rate gain in accordance with whether there is filtering processing.

FIG. 6 shows a difference in the yaw rate gain in accordance with whether there is attenuation processing by band-stop filter 152a under the condition of a low vehicle speed.

When attenuation processing by band-stop filter 152a is not performed, the yaw rate gain shows a change of rising when turning frequency f is within a frequency range from about 1 Hz to about 3 Hz.

In addition, when attenuation processing by band-stop filter 152a is performed, the rise in the yaw rate gain is suppressed even when turning frequency f is within from about 1 Hz to about 3 Hz.

Therefore, a case in which the yaw rate gain of vehicle 10 becomes too sensitive with respect to the steering operation by the driver is suppressed, and the steering performance of the vehicle is improved.

In the embodiment described above, turning angle changing unit 152 changes the characteristics (in detail, the attenuation range and the attenuation rate) of band-stop filter 152a in accordance with vehicle speed VS. However, it is further possible to suppress a case in which the yaw rate gain rises when the steering operation is started from a state in which steering wheel 11 is maintained at a freely selected operation angle θ by changing the characteristics of band-stop filter 152a in accordance with operation angle θ.

Figure 7:
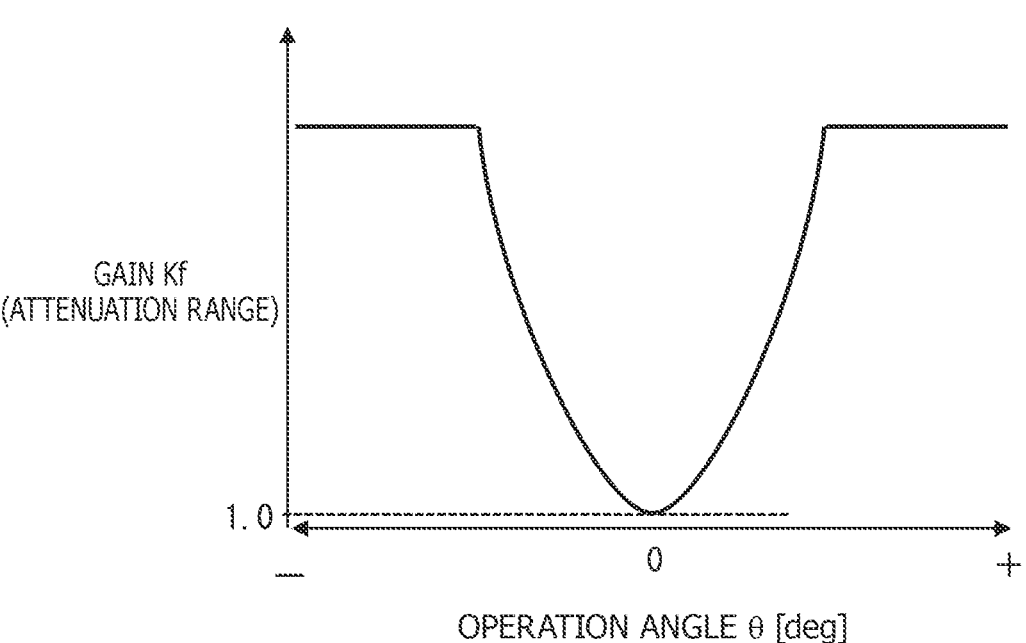
FIG. 7 is a line map showing the correlation between operation angle $\theta$ and a gain Kf of an attenuation range.

FIG. 7 is a diagram showing one aspect of a characteristics change of band-stop filter 152a based on operation angle θ, and shows the correlation between operation angle θ and gain Kf used in the change of the attenuation range of band-stop filter 152a.

Here, gain Kf is set to a greater value as the absolute value of operation angle θ increases, and gain Kf is set to a minimum value (minimum value=1) when steering wheel 11 is in a neutral position and operation angle θ is zero.

When gain Kf is set based on operation angle θ, turning angle changing unit 152 changes the attenuation range of band-stop filter 152a by changing a fundamental frequency ω a by multiplying fundamental frequency ω a by gain Kf.

In other words, turning angle changing unit 152 changes the attenuation range that is the frequency range in which turning angle command value σtg is changed to be lower to a higher frequency as the absolute value of operation angle θ increases by multiplying fundamental frequency ω by gain Kf.

As a result, it becomes possible to substantially invalidate the filtering processing by band-stop filter 152a and realize rapid vehicle motion when the direction of vehicle 10 is desired to be rapidly changed by causing the absolute value of operation angle θ to be greater at the time of emergency avoidance and the like.

In addition, when steering wheel 11 is turned from a state of being maintained in the neutral position, gain Kf is in the vicinity of 1. Therefore, the attenuation range that is a frequency range in which turning angle command value σtg is changed to be lower is maintained at the initial setting (for example, a frequency from about 1 Hz to about 3 Hz), and filtering processing that suppresses the rise in the yaw rate gain is enabled.

The rising change of the yaw rate gain greatly affects the steering property when steering wheel 11 is started to be turned from an orientation around the neutral position. Therefore, the rise in the yaw rate gain can be effectively suppressed by enabling the filtering processing around the neutral position.

Figure 8:
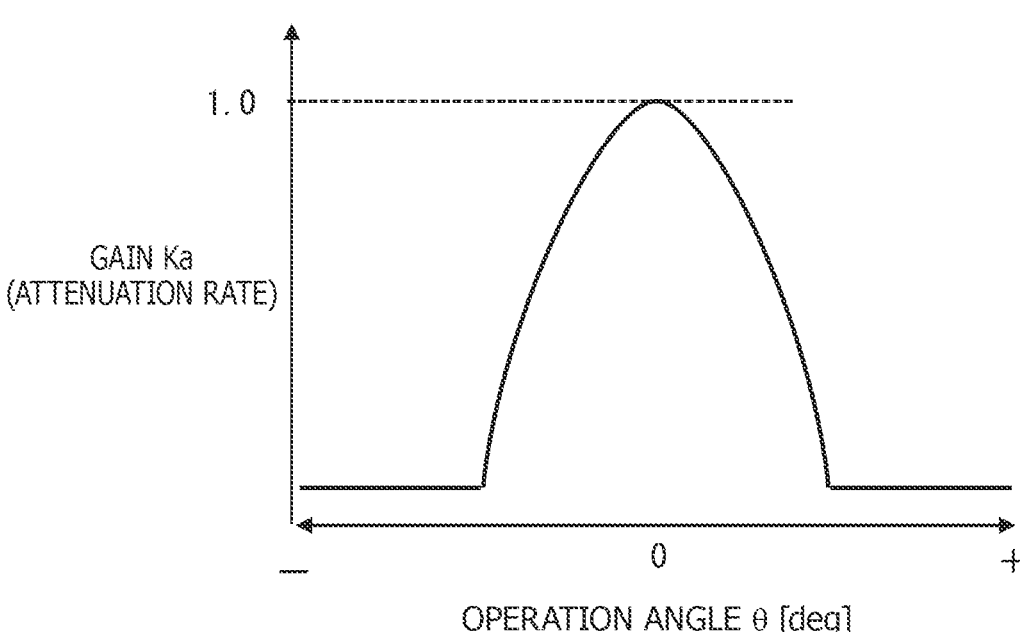
FIG. 8 is a line map showing the correlation between operation angle $\theta$ and a gain Ka of an attenuation rate.

FIG. 8 is a diagram showing another aspect of a characteristics change of band-stop filter 152a based on operation angle θ, and shows the correlation between operation angle θ and gain Ka used in the change of the attenuation rate of band-stop filter 152a.

Here, gain Ka is set to a maximum value (maximum value=1) when steering wheel 11 is in the neutral position and operation angle θ is zero, and it is changed to be a lower value as the absolute value of operation angle θ increases.

When gain Ka is set based on operation angle θ, turning angle changing unit 152 changes the attenuation rate of band-stop filter 152a by changing a filter constant by multiplying filter constant ζ by gain Ka.

In other words, turning angle changing unit 152 changes the attenuation rate to be lower and causes the changing degree of turning angle command value σtg by band-stop filter 152 to be lower as the absolute value of operation angle θ increases by performing correction by multiplying filter constant ζ by gain Ka.

As a result, it becomes possible to greatly reduce the filtering effect by band-stop filter 152a and realize rapid vehicle motion when the direction of vehicle 10 is desired to be rapidly changed by causing the absolute value of operation angle θ to be greater at the time of emergency avoidance and the like.

In addition, when steering wheel 11 is turned from a state of being maintained in the neutral position, gain Ka is in the vicinity of 1. Therefore, the attenuation rate that is a degree by which turning angle command value σtg is changed to be lower is maintained at the initial setting, and a filtering effect of suppressing the rise in the yaw rate gain is exhibited.

The rising change of the yaw rate gain greatly affects the steering property when steering wheel 11 is started to be turned from an orientation around the neutral position. Therefore, the rise in the yaw rate gain can be effectively suppressed by exhibiting the filtering effect around the neutral position.

The technical ideas described in the embodiment described above can be used by being combined with each other, as appropriate, as long as there is no conflict.

The content of the present invention has been described with reference to a preferable embodiment, but it is obvious that one skilled in the art may obtain various modified aspects based on basic technical ideas and teachings of the present invention.

For example, in the embodiment described above, the attenuation range and the attenuation rate of band-stop filter 152a are variable in accordance with the condition of vehicle speed VS. However, it is possible to set the attenuation range and the attenuation rate of band-stop filter 152a to be fixed values and process turning angle command value σtg by band-stop filter 152$a$ only when vehicle speed VS is in the vicinity of a certain speed (for example, in the vicinity of 10 km/h).

The filtering processing that attenuates components of turning angle command value σtg in a predetermined frequency range can also be realized by processing of correcting data of turning angle command value σtg by a correction value, processing of limiting data of turning angle command value σtg by a limiter, and the like, and is not limited to a configuration using band-stop filter 152$a$.

Turning angle changing unit 152 can learn the attenuation range and/or the attenuation rate based on the yaw rate gain generated when turning angle command value σtg is processed by band-stop filter 152$a$.

Turning angle changing unit 152 can change the attenuation rate of band-stop filter 152$a$ in accordance with the selection by the driver, and can change the attenuation rate of band-stop filter 152$a$ to be lower when the driver desires characteristics with which the direction of vehicle 10 rapidly changes.

A system that separately includes an electronic control device that controls turning actuator 13 and an electronic control device that controls reaction force actuator 14 can be used.

The filtering processing unit is not limited to band-stop filter 152$a$, and processing in which turning angle command value σtg is resultantly attenuated when the frequency of turning angle command value σtg is in a predetermined frequency range can be performed.

REFERENCE SYMBOL LIST

10 Vehicle
11 Steering wheel (steering operation input member)
12-1, 12-2, 12-3, 12-4 Road wheel
13 Turning actuator
14 Reaction force actuator
15 Control device
100 Steering device
151 Turning angle command unit
152 Turning angle changing unit
152$a$ Band-stop filter (filtering processing unit)
153 Steering gear ratio variable unit
155 Driving unit

The invention claimed is:

1. A steer-by-wire steering device to be mounted on a vehicle, the steer-by-wire steering device comprising:
  a steering operation input member;
  a turning actuator that applies a turning force to road wheels based on a driving signal; and
  a control device that outputs the driving signal that causes a turning speed of the road wheels with respect to an operation speed of the steering operation input member to be slower when a yaw rate gain of the vehicle shows a change of rising with respect to the operation speed.

2. The steering device according to claim 1,
  wherein the control device includes:
    a turning angle command unit that obtains a turning angle command value based on an operation angle of the steering operation input member;
    a turning angle changing unit that acquires the turning angle command value, and changes and outputs the turning angle command value when a frequency of the turning angle command value is in a predetermined frequency range; and
    a driving unit that outputs the driving signal to the turning actuator based on the turning angle command value output from the turning angle changing unit.

3. The steering device according to claim 2, wherein the turning angle changing unit executes filtering processing that attenuates a component of the turning angle command value in the predetermined frequency range.

4. The steering device according to claim 3, wherein the turning angle changing unit comprises a band-stop filter.

5. The steering device according to claim 3,
  wherein the control device includes
  a steering gear ratio variable unit capable of varying a steering gear ratio that is a ratio of a turning angle of the road wheels to an operation angle of the steering operation input member in accordance with a vehicle speed of the vehicle; and
  the turning angle command unit obtains the turning angle command value based on the operation angle of the steering operation input member and the steering gear ratio.

6. The steering device according to claim 5,
  wherein the steering gear ratio variable unit causes the steering gear ratio to be lower as the vehicle speed of the vehicle decreases.

7. The steering device according to claim 3,
  wherein the turning angle changing unit changes the turning angle command value based on the vehicle speed of the vehicle.

8. The steering device according to claim 7,
  wherein the turning angle changing unit causes an attenuation rate of the turning angle command value to decrease as the vehicle speed of the vehicle increases.

9. The steering device according to claim 3,
  wherein the turning angle changing unit changes the turning angle command value when the steering operation input member is operated from a state in which the steering operation input member is maintained at a freely selected operation angle.

10. A method for controlling a steer-by-wire steering device to be mounted on a vehicle,
  the steering device including:
    a steering operation input member; and
    a turning actuator that applies a turning force to a wheel,
  the method for controlling comprising:
    a step of obtaining the turning angle command value based on an operation angle of the steering operation input member;
    a step of changing the turning angle command value when a frequency of the turning angle command value is in a predetermined frequency range; and
    a step of controlling the turning actuator based on the turning angle command value after the change.

* * * * *